Patented Feb. 23, 1926.

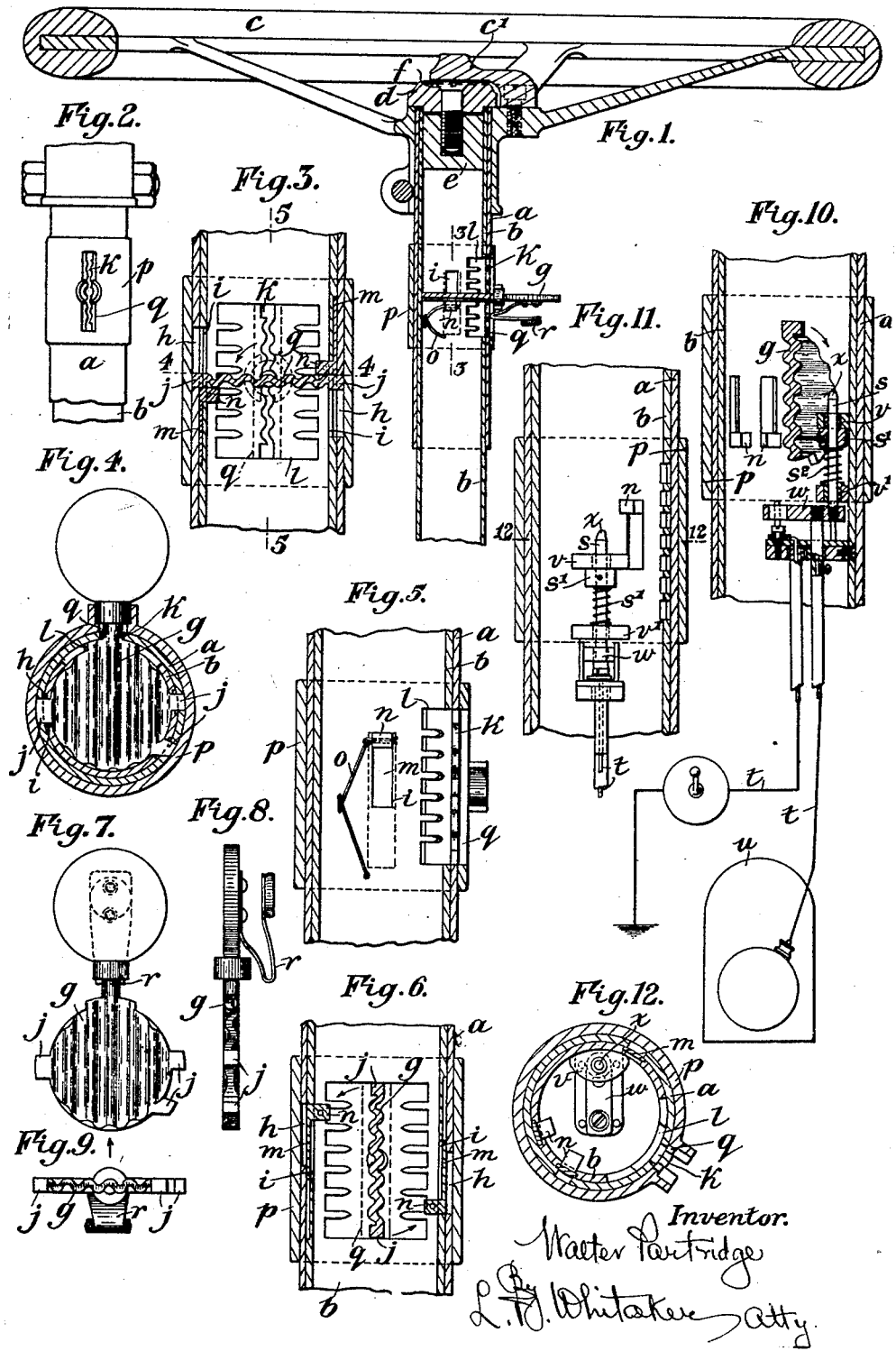

1,573,855

UNITED STATES PATENT OFFICE.

WALTER PARTRIDGE, OF CHADWELL HEATH, ENGLAND.

LOCKING DEVICE FOR MOTOR CARS, MOTOR CYCLES, AND CYCLES FOR PREVENTION OF THEFT.

Application filed November 22, 1924. Serial No. 751,427.

*To all whom it may concern:*

Be it known that I, WALTER PARTRIDGE, a subject of the King of Great Britain, residing at 2 Fern Villas, High Road, Chadwell Heath, Essex, England, have invented a new and useful Locking Device for Motor Cars, Motor Cycles, and Cycles for Prevention of Theft, of which the following is a specification.

This invention relates to means for preventing the unauthorized use of motor cars and motor and other cycles.

According to the invention I construct the steering rod or column in two independent parts connected respectively with the steering wheels and the steering hand-wheel or handle-bars and normally locked together by a key the removal of which prevents the vehicle being steered.

In a suitable arrangement for carrying out the invention the upper portion of the steering rod or column is made of two tubes fitting one upon the other, the inner one being a continuation of the remainder of the said rod or column whilst the outer one is attached to the steering hand-wheel or handle-bars. One or more slots is or are formed in both tubes with which a corresponding bit or bits on a key inserted through other slots in the two tubes is or are designed to engage or lock when the key is turned, thereby locking the two tubes together to enable the steering to be effected by the operation of the steering hand-wheel or handle-bars. The locking slot or slots in the inner tube is or are advantageously closed, when the tubes are unlocked, by a sliding shutter or shutters operated by a spring or springs and designed to be opened by the key when the latter is turned into the locking position. The key slot in the inner tube is also advantageously made wider than is required for the entrance of the key, the edges of the slot being serrated or toothed to prevent the rotation of cranked wires or the like which might be inserted through the key slots to effect a locking together of the two tubes. A sleeve is also provided on the outer tube to cover the slots with which the bit or bits of the key co-operate.

To prevent a motor-car or motor-cycle provided with my improvements from being started until the key is in the locking position I arrange the usual switch controlled earthing wire of the magneto or other spark generator, in connection with the two-part steering rod or column in such a manner that the said generator is earthed thereby until the key is placed in position and operated to lock the said parts of the said steering rod or column together.

This is advantageously effected by a switch operated by the said key and comprising a rod in circuit with the portion of the earthing wire connected to the magneto or the like and slidable longitudinally in insulated bearings in the inner tube of the two-part rod or column and normally making an earth contact by spring pressure through the medium of the said tube. This switch rod has an arm for making contact with the portion of the earthing wire containing the usual earthing switch, when the said switch rod is operating by the locking key, the point of the rod against which the key acts being protected by a piece of insulating material.

To enable the invention to be fully understood I will describe it by reference to the accompanying drawing, in which:—

Figure 1 is a sectional elevation of a steering hand-wheel and a portion of the steering column of a motor vehicle showing the locking device in accordance with the invention with the key in the locking position.

Figure 2 is a view at right angles to Figure 1, of a portion of the steering column and hand-wheel but with the key removed.

Figure 3 is a section on the line 3—3, Figure 1, but drawn to a larger scale, and Figure 4 is a section on the line 4—4, Figure 3.

Figure 5 is a section on the line 5—5, Figure 3, but with the key removed and

Figure 6 is a similar view to Figure 3, but showing the key in another position.

Figures 7 and 8 are, respectively, elevations at right angles of the operating key and Figure 9 is a view looking in the direction of the arrow, Figure 7.

Figure 10 is a view somewhat similar to Figure 6, but showing the switch device arranged in the steering rod or column in circuit with the magneto or spark generator earthing circuit and designed to be operated by the locking key.

Figure 11 is a section at right angles to Figure 10, but with the key removed.

Figure 12 is a section on the line 12—12, Figure 11.

$a$ and $b$ are, respectively, the two tubes forming the upper part of the steering column of a motor-car, the tube $a$ fitting over the tube $b$ and having the steering hand-wheel $c$ attached thereto, whilst the inner tube $b$ is attached to the remainder or lower portion, not shown, of the said column. The tube $a$ is held in position in one direction longitudinally of the tube $b$ by the disc $d$ secured by a screw $f$ to a plug $e$ fixed in the said tube $b$, and in the opposite direction by the bracket $c^1$ attached to the wheel $c$ and extending over the disc $d$, but it is free to be rotated on the said tube when the wheel $c$ is turned so that the car is incapable of being steered by the said wheel.

$g$ is the key for locking the tubes $a$ and $b$ together to enable the car to be steered, and $h$, $i$ indicate, respectively, the slots in the said tubes $a$ and $b$ designed, when in register, to receive the bits $j$ on the key when the latter is inserted through the vertical slots $k$, $l$ in the tubes $a$ and $b$, respectively, into the position indicated in Figure 6, the key, after such insertion, being turned into the horizontal position indicated in Figures 1 and 3 to engage the said bits with the said slots, into which they fit without any shake. The slot $l$ in the tube $b$ is shown wider than the slot $k$ and serrated on both edges to prevent the rotation of cranked wires or the like which might be inserted through the key slots to effect a locking together of the two tubes $a$ and $b$. The slot $k$ is made of sinuous or corrugated form to prevent the insertion therein of a flat bar which might be employed for locking the parts together, the key being made of corresponding form in section.

$m$ indicates the sliding shutters in the slots $b$ for closing them in the unlocked position of the tubes $a$ and $b$, each shutter having a lug or projection $n$ with which the bits $j$ make contact in the rotation of the key $g$ to move the shutters against the pressure of springs $o$.

$p$ is the sleeve attached to the tube $a$ to cover the slots $h$, $i$ and provided with a slot $q$ in register with the slot $k$ to allow the insertion of the key $g$. The said key is provided with a spring tongue $r$ which snaps into the said slot $q$ when the said key is in the horizontal or locking position and maintains it in this position.

$s$, Figures 10, 11 and 12, is the switch which I find it advantageous to employ in circuit with the usual earthing wire $t$ of the magneto $u$, or other spark generator. The said switch is in the form of a rod slidable in the insulated bearings $v$, $v^1$ in the tube $b$ and carries an arm $w$ directly connected to the magneto or the like by one part of the wire $t$ and making contact with the bearing $v$ by means of the collar $s^1$ so as to earth the magneto when the key $g$ is absent from the tubes $a$ and $b$ but when the key is placed in position to lock the said tubes together, to move the rod $s$ down against the pressure of the spring $s^2$ and cause the arm $w$ to make contact with and complete the circuit of the two parts of the earth wire $t$. $x$ is the piece of insulating material on the end of the rod $s$ with which the key $g$ makes contact.

Claims—

1. The combination with a steering column comprising two concentric tubes rotatably supported with respect to each other, and a hand operated steering device secured to one of said tubes, said tubes being provided with vertical registering slots for the insertion of a key, and laterally disposed registering slots for the reception of locking bits on the key, to lock said tubes together when the key is inserted and turned.

2. The combination with a steering column, comprising two concentric tubes rotatably supported with respect to each other, and a hand operated steering device secured to one of said tubes, said tubes being provided with vertical registering slots for the insertion of a key, and laterally disposed registering slots for the reception of locking bits on the key, to lock said tubes together when the key is inserted and turned, the outer vertical slot being of corrugated form, and the inner vertical slot having its edges serrated, and the key being corrugated to conform to the outer slot.

3. The combination with a steering column, comprising two concentric tubes rotatably supported with respect to each other, and a hand operated steering device secured to one of said tubes, said tubes being provided with vertical registering slots for the insertion of a key, and laterally disposed registering slots for the reception of locking bits on the key, to lock said tubes together when the key is inserted and turned interior sliding shutters for closing the bit engaging slots, springs for moving the shutters to closed position, and projections on said shutters adapted to be engaged by the key to permit the bits to enter said bit engaging slots.

4. The combination with a steering column, comprising two concentric tubes rotatably supported with respect to each other, and a hand operated steering device secured to one of said tubes, said tubes being provided with vertical registering slots for the insertion of a key, and laterally disposed registering slots for the reception of locking bits on the key, to lock said tubes together when the key is inserted and turned, a switch for cutting the ignition mechanism into and out of operation, a spring for normally moving said switch to inoperative position, said switch having a part in the path of said key when the latter is rotated to engage the bits with the bit engaging slots to operate said switch to place the ignition mechanism in operative condition.

WALTER PARTRIDGE.